(12) United States Patent
Ishii et al.

(10) Patent No.: US 7,675,574 B2
(45) Date of Patent: Mar. 9, 2010

(54) DISPLAY MODE SWITCHING APPARATUS, METHOD AND PROGRAM PRODUCT

(75) Inventors: Keita Ishii, Tokyo (JP); Masaki Oie, Machida (JP); Yasumasa Takeda, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1330 days.

(21) Appl. No.: 10/908,600

(22) Filed: May 18, 2005

(65) Prior Publication Data

US 2005/0266923 A1    Dec. 1, 2005

(30) Foreign Application Priority Data

May 31, 2004    (JP)    .............................. 2004-161776

(51) Int. Cl.
*H04N 5/46*    (2006.01)
(52) U.S. Cl. ........................ 348/558; 348/552; 348/445
(58) Field of Classification Search ................ 348/552, 348/554–556, 558, 441, 445; 345/326–358, 345/115, 698–699; *H04N 5/46*
See application file for complete search history.

(56) References Cited

U.S. PATENT DOCUMENTS

| | | | | |
|---|---|---|---|---|
| 6,259,440 | B1 | 7/2001 | Vaughan | 345/327 |
| 6,285,406 | B1 * | 9/2001 | Brusky | 348/552 |
| 6,314,479 | B1 | 11/2001 | Frederick | 710/63 |
| 6,678,007 | B2 * | 1/2004 | Nason et al. | 348/564 |
| 6,724,351 | B1 * | 4/2004 | Boger | 345/3.2 |
| 2002/0080270 | A1 | 6/2002 | Chambers | 348/448 |

* cited by examiner

*Primary Examiner*—Trang U Tran
(74) *Attorney, Agent, or Firm*—Ference & Associates LLC

(57) ABSTRACT

A display mode switching device and method automatically switches a display mode of a television set to an overscan mode or to an underscan mode depending on a content of a screen. In a case of connecting a television set to a computer, a call from an application for an API in an OS is detected by a device driver when a user starts playing a DVD or a game. Accordingly, an output mode for the television set is switched to the overscan mode. In this way, a motion video or a game is displayed on the television set in the overscan mode. Meanwhile, when the user finishes playing the DVD or the game, a call for the API to release resources is detected by the device driver, and the output mode is restored to the underscan mode. In this way, a computer screen is displayed on the television set in the underscan mode.

4 Claims, 4 Drawing Sheets

DISPLAY MODE SWITCHING APPARATUS, METHOD AND PROGRAM PRODUCT

BACKGROUND OF THE INVENTION

The present invention relates to a display mode switching device, a display mode switching method, a display mode switching program, and a computer-readable recording medium recording the display mode switching program. More specifically, the present invention relates to a display mode switching device, a display mode switching method, a display mode switching program, and a computer-readable recording medium with the display mode switching program stored therein, which are configured to switch a display mode of a television set automatically between an overscan mode and an underscan mode.

Unlike a computer display monitor, about 10% in size of a screen is hidden at four edges by bezels and is not therefore displayed on a consumer television set. This display mode will be referred to as an "overscan" mode.

The overscan mode is suitable for a display on a television screen. However, this mode is not suitable for a display on a computer screen. The television screen mainly displays motion videos, in which important information is usually displayed in the center. On the contrary, the computer screen mainly displays still images, in which important information (such as icons or menu items) is often displayed close to four edges of the screen. Accordingly, when the computer screen is displayed on the television set, the entire computer screen is often scaled down to an effective display area of the television set. This display mode will be referred to as an "underscan" mode.

When a computer is connected to a television set, it is preferable to use the underscan mode to display a normal computer screen (such as a desktop screen of an operating system (OS)). However, it is preferable to use the overscan mode when playing a game or a digital versatile disk (DVD) movie, because it is more visible to spread the screen all over a display even if four edges of the screen are hidden by the bezels.

As described above, when a user connects the computer to the television set, the user may wish to display the normal computer screen in the underscan mode but the motion videos and the game in the overscan mode. However, it is cumbersome for the user to switch between the overscan mode and the underscan mode manually.

The following Patent Document 1 discloses a screen display range switching method of switching a display mode for a cathode ray tube (CRT) between the overscan mode and the underscan mode. This method is configured to display an image outputted from a computer in the underscan mode and to display an image outputted from a television tuner in the overscan mode by turning a switch. However, this method requires special hardware for switching between the overscan mode and the underscan mode. In addition, the image outputted from the computer will be always displayed in the underscan mode. Accordingly, even when a DVD is played on the computer, the image will be displayed in the underscan mode.

[Patent Document 1] Japanese Unexamined Patent Publication No. 61(1986)-176973

[Patent Document 2] Japanese Unexamined Patent Publication No. 2000-194347

SUMMARY OF THE INVENTION

A purpose of the present invention is to provide a display mode switching device, a display mode switching method, a display mode switching program, and a computer-readable recording medium with the display mode switching program stored therein, which are configured to switch a display mode of a television set automatically between an overscan mode and an underscan mode depending on a content on a screen.

A display mode switching device according to the present invention includes a content identifying mechanism and a switching mechanism. The content identifying mechanism identifies a content to be displayed on a television set. The switching mechanism switches an output mode to the television set between an overscan mode and an underscan mode depending on a result of identification by the content identifying mechanism.

In this display mode switching device, the content to be displayed on the television set is identified and the output mode to the television set is switched between the overscan mode and the underscan mode depending on the result of identification. Accordingly, this display mode switching device can switch the display mode of the television set automatically between the overscan mode and the underscan mode depending on the content on the screen.

Preferably, the content identifying mechanism further includes logic for identifying the content to be displayed on the television set by detecting a call for a given application program interface (API) from any one of a motion video player application and a game application.

In this case, the call for the API is detected from the application and the content is identified by the call. Accordingly, it is possible to realize the content identifying mechanism by a simple configuration.

Preferably, the content identifying mechanism further includes logic for identifying that the content to be displayed on the television set is any one of a motion video and a game by detecting a call for a given application program interface (API) from any one of a motion video player application and a game application. Meanwhile, the switching mechanism further includes logic for switching the output mode for the television set to the overscan mode on condition that the content to be displayed on the television set is identified as any one of the motion video and the game.

The call for the API is detected from the motion video player application or the game application in a case where the user starts playing the motion video or the game. In this way, the content to be displayed on the television set is identified either as the motion video or as the game. In this case, the output mode to the television set is automatically switched to the overscan mode.

Preferably, the content identifying mechanism further includes logic for identifying that the content to be displayed on the television set is a normal computer screen by detecting a call for a given application program interface (API) from any one of a motion video player application and a game application. Meanwhile, the switching mechanism further includes logic for switching the output mode for the television set to the underscan mode on condition that the content to be displayed on the television set is identified as the normal computer screen.

The call for the API is detected from the motion video player application or the game application in a case where the user stops playing the motion video or the game. In this way, the content to be displayed on the television set is identified as the normal computer screen. In this case, the output mode to the television set is automatically switched to the underscan mode.

Preferably, the switching mechanism further modifies at least any one of a gamma value, brightness of the screen, contrast of the screen, and a tint of the screen.

In this case, the gamma value, the brightness of the screen, the contrast of the screen, the tint of the screen, and the like are also switched automatically in response to switching of the output mode.

Meanwhile, a display mode switching method according to the present invention is an operation method for using the display mode switching device. Moreover, a display mode switching program according to the present invention is a program for causing a computer to execute respective steps of the display mode switching method. Furthermore, a recording medium according to the present invention is a computer-readable recording medium with the display mode switching program stored therein.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
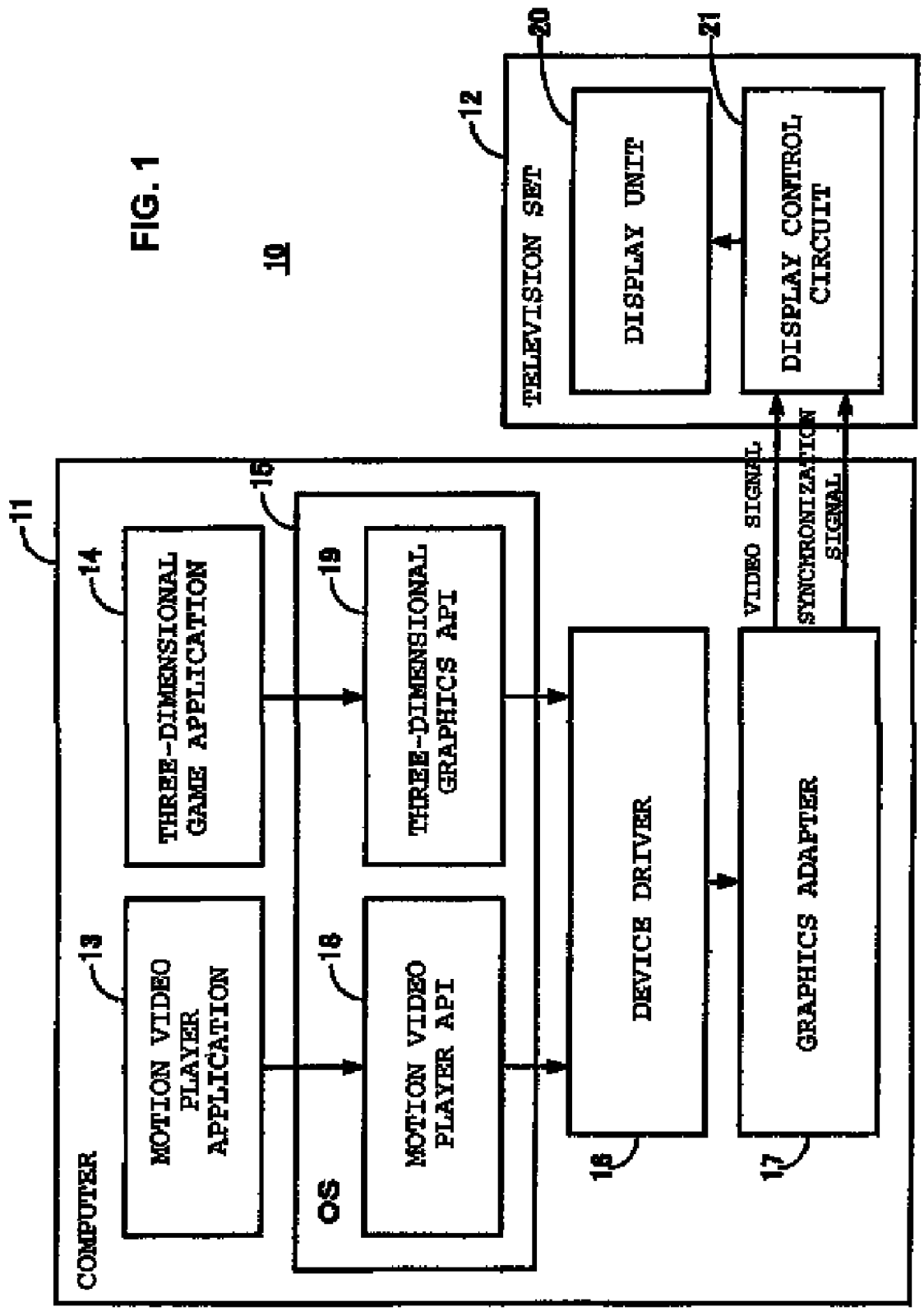
FIG. 1 is a functional block diagram showing an overall configuration of a computer system applying a display mode switching device according to an embodiment of the present invention.

Referring now more particularly to the accompanying drawings, in which like numerals indicate like elements or steps throughout the several views, FIG. 1 depicts a computer system 10 adopting a display mode switching device according to an embodiment of the present invention includes a computer 11 and a television set 12 connected thereto. Here, a commercial television set 12 is used as a display device instead of a computer monitor.

The computer 11 includes a motion video player application 13, a three-dimensional game application 14, an operation system (OS) 15, a device driver 16, and a graphics adapter 17.

Figure 2:
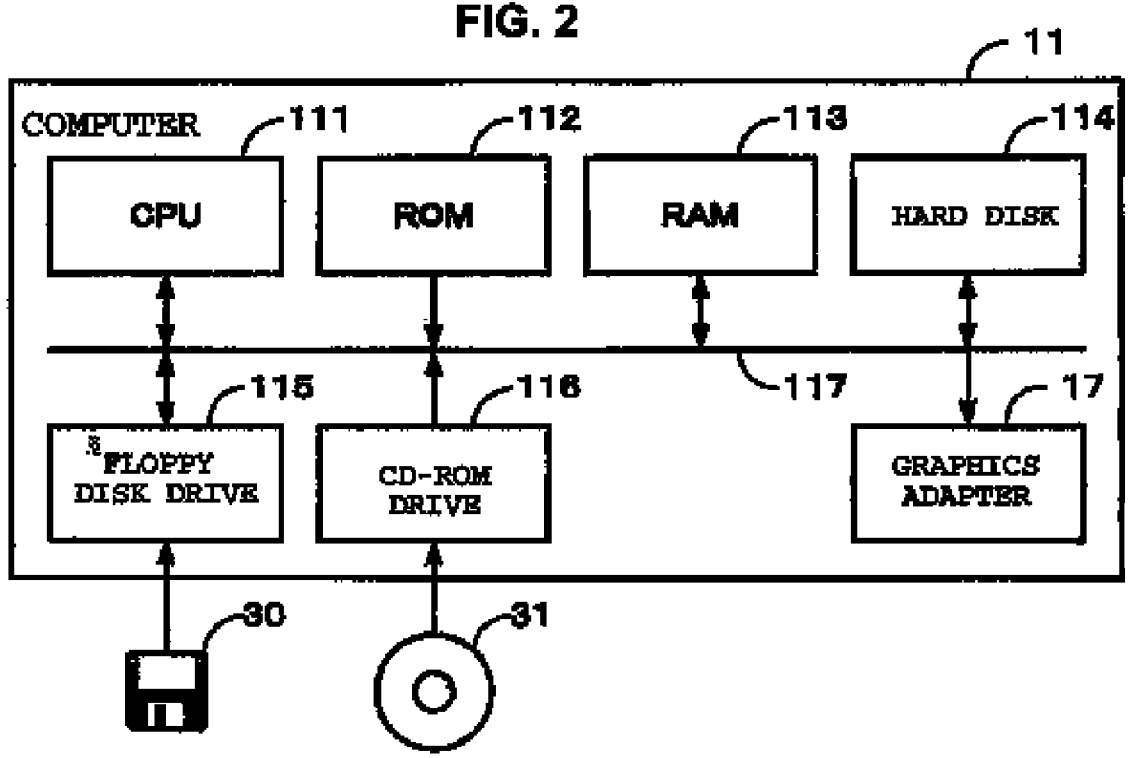
FIG. 2 is a functional block diagram showing a hardware configuration of a computer in FIG. 1.

Referring to FIG. 2, the computer 11 generally includes a central processing unit (CPU) 111, a read-only memory (ROM) 112, a random access memory (RAM) 113, a hard disk 114, a flexible disk (FD) drive 115, a compact disk read-only memory (CD-ROM) drive 116, the graphics adopter 17, and a bus 118 connecting these constituents to one another.

The applications 13 and 14, the OS 15, and the device driver 16 each shown in FIG. 1 are software, which may be initially provided in a state where all of them are stored in a flexible disk 30 or in a CD-ROM 31. Then, each software is read out of the flexible disk 30 or the CD-ROM 31 by use of the FD drive 115 or the CD-ROM drive 116, and is installed in the hard disk 114.

The OS 15 includes application program interfaces (APIs) 18 and 19 each having a multimedia processing function. For example, the Windows® produced by Microsoft Corporation includes an API called DirectX®. The DirectX further includes various APIs such as DirectDraw® for playing motion videos or Direct3D® for running three-dimensional graphics.

The device driver 16 is generally a program for controlling the graphics adapter 17 in response to instructions from the APIs 18 and 19. Here, the device driver 16 particularly includes a display mode switching program (reference numeral 160 in FIG. 4 and FIG. 5) according to the embodiment of the present invention. By installing the device driver 16 including this display mode switching program, the hardware resources of the computer 11 realizes the display mode switching method according to the embodiment of the present invention.

Figure 3:
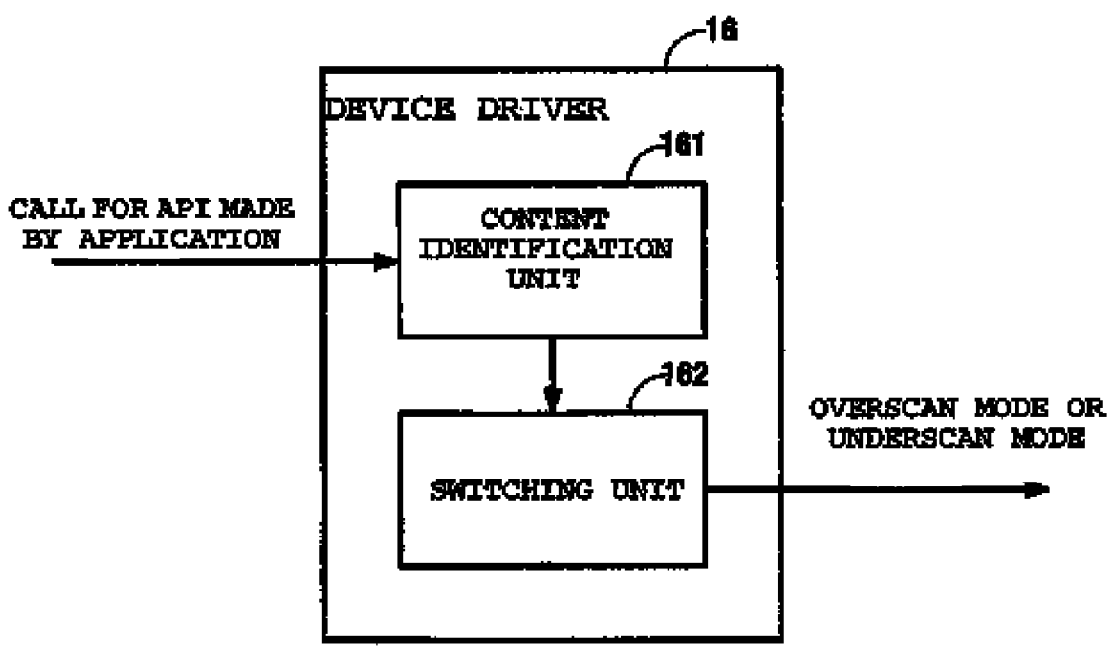
FIG. 3 is a functional block diagram showing a configuration of the device driver in FIG. 1.

Referring to FIG. 3, the device driver 16 includes a content identification unit 161 and a switching unit 162, which collectively constitute the display mode switching program. The content identification unit 161 identifies a content to be displayed on the television set 12. The switching unit 162 switches an output mode for the television set 12 to an overscan mode or to an underscan mode depending on a result of identification. To be more precise, the content identification unit 161 detects a call for the motion video player application API or the three-dimensional graphics API from the motion video player application 13 or the game application 14, and thereby identifies that the content to be displayed on the television set 12 is any one of a motion video, a game, and a normal computer screen. The switching unit 162 switches the output mode for the television set 12 to the overscan mode when the content to be displayed on the television set 12 is identified either as the motion video or as the game, or switches the output mode to television set 12 to the underscan mode when the content to be displayed on the television set 12 is identified as the normal computer screen. In addition to the output mode, the switching unit 162 also switches a gamma value, brightness of the screen, contrast of the screen, a tint of the screen, and the like.

The "normal computer screen" cited herein may be a desktop screen for displaying icons, task bars, Windows, and the like, for example. The normal computer screen includes a maximized window, but does not include a full-screen display of the motion video or the game.

The device driver 16 including the display mode switching program is distributed in a manner that it is stored in a computer-readable recording medium including an optical disk such as a CD-ROM or a digital versatile disk read-only memory (DVD-ROM), a magnetic disk such as a flexible disk or a hard disk, and a semiconductor memory such as a ROM or a random access memory (RAM), or is uploaded to a website on the Internet.

The graphics adapter 17 is generally a hardware including an image display function. Here, the graphics adapter 17 particularly includes a high-speed processing function for a motion video and three-dimensional graphics.

Meanwhile, the television set 12 includes a display unit 20 and a display control circuit 21. A CRT, a liquid crystal display (LCD) device, or a plasma display device is used as the display unit 20, for example. The display control circuit 21 causes the display unit 20 to display an image based on a video signal and a synchronization signal outputted from the graphics adapter 17.

Figure 4:
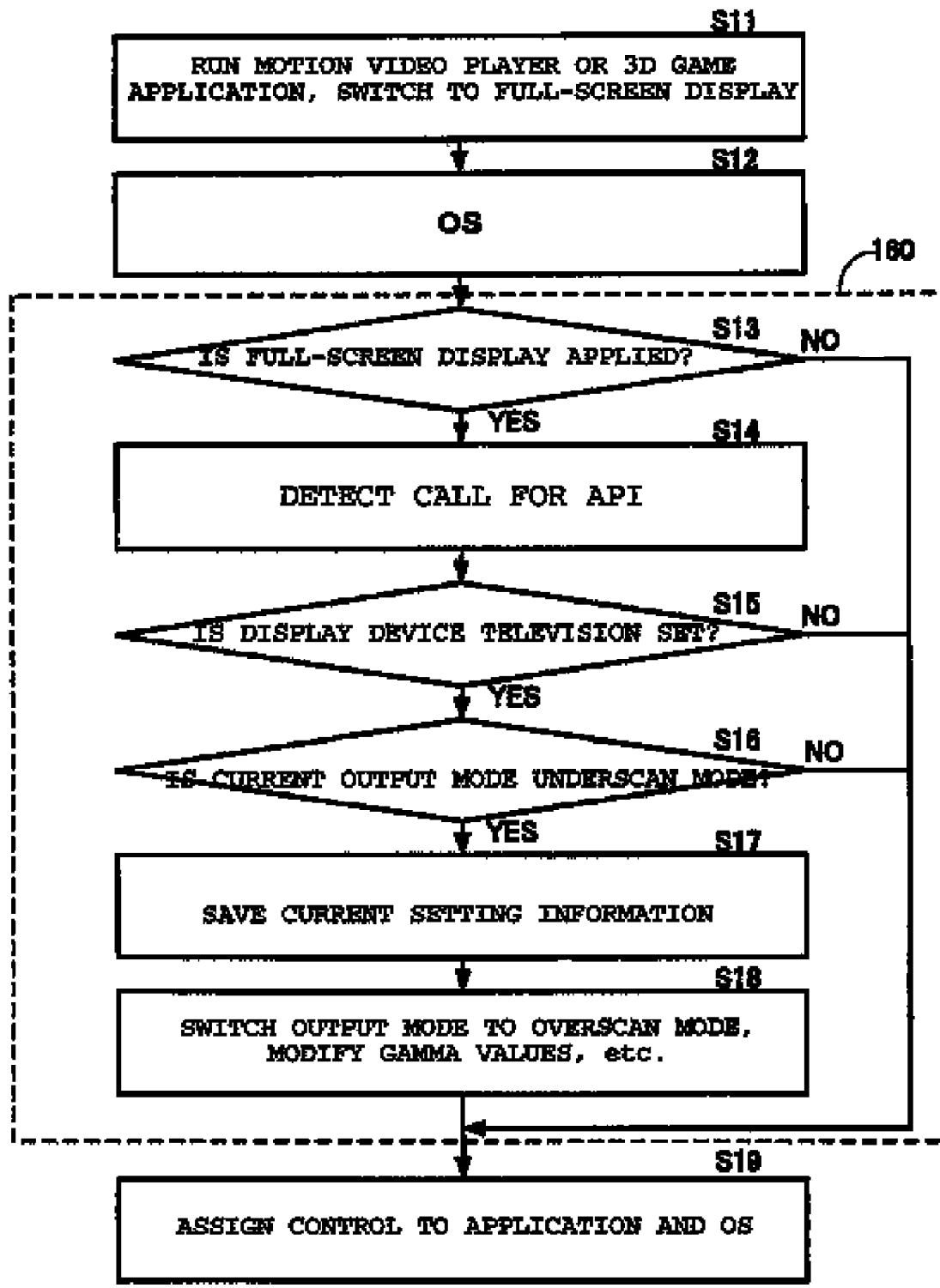
FIG. 4 is a flowchart of an operation for causing the computer system shown in FIG. 1 to perform a full-screen display of a motion video or three-dimensional graphics.
Figure 5:
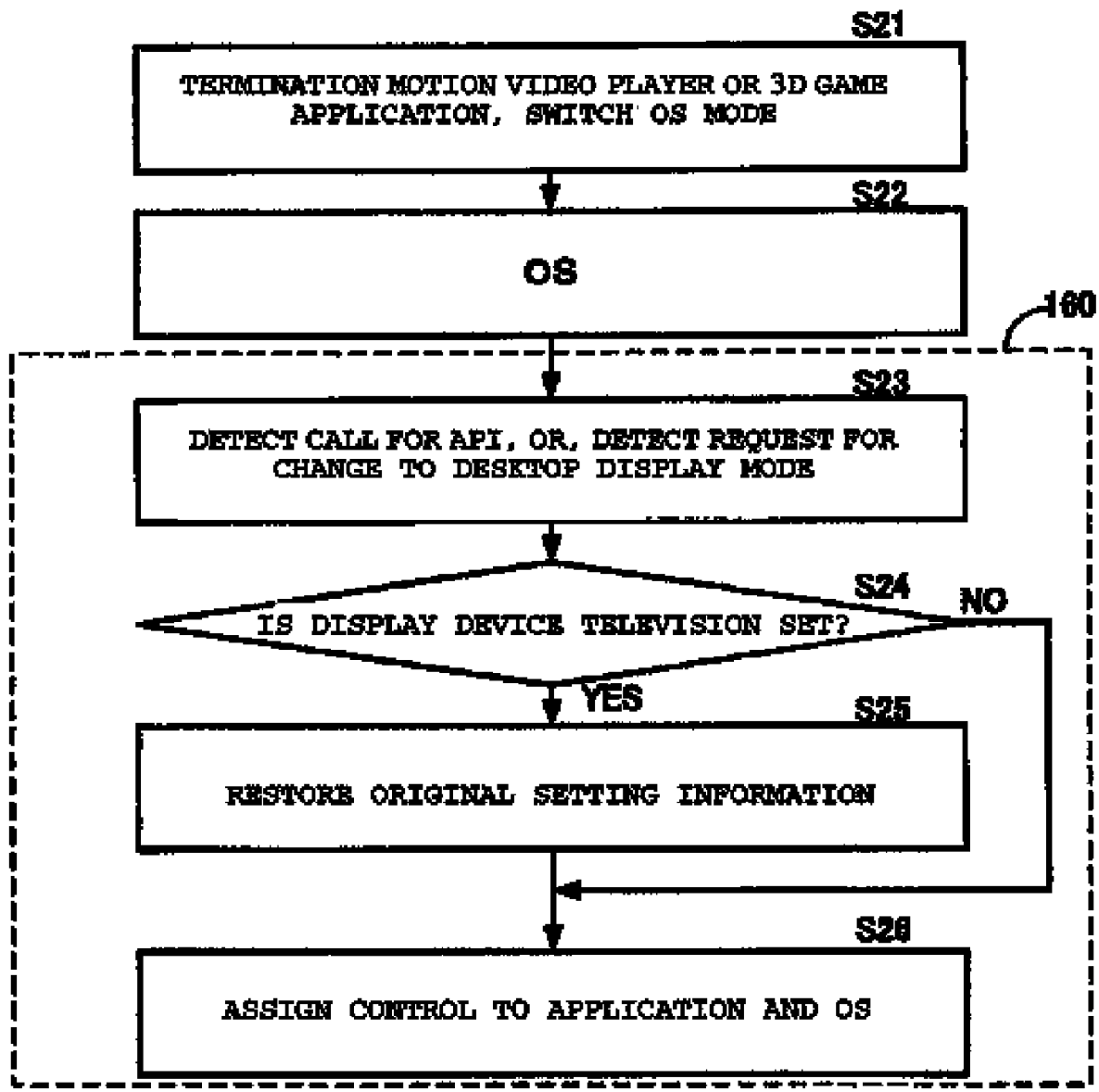
FIG. 5 is a flowchart of an operation for causing the computer system shown in FIG. 1 to display a normal computer screen.

Next, operations of the above-described computer system will be described with reference to FIG. 4 and FIG. 5. The display mode switching program 160 is a program for causing the computer 11 to execute Steps S13 to S18 in FIG. 4 and Steps S23 to S25 in FIG. 5.

(1) When Displaying Motion Video or Three-Dimensional Game in Full-Screen

The motion video player application 13 runs when a user plays a DVD and the like. Meanwhile, the three-dimensional game application 14 runs when the user plays the game. Here, the display mode of the screen is switched to a full-screen display mode (S11).

The application 13 or 14 is operated on the OS 15, and calls the API 18 or 19 in the OS 15 (S12).

The device driver 16 determines whether or not the display mode of the screen is the full-screen display mode (S13). When the display mode is the full-screen display mode, the process goes to the next Step S14. If the display mode is not the full-screen display mode, the process skips to Step S19 to be described later.

In addition to the APIs 18 and 19, the OS 15 also includes an API (not shown) for setting the display mode of the screen. The application 13 or 14 calls for this API and the OS 15 requests the device driver 16 to set up the display mode of the screen. Therefore, the device driver 16 can determine whether or not the display mode of the screen is the full-screen display mode by detecting this call.

In the case of the full-screen display mode, the device driver 16 detects the call from the API 18 or 19 (S14). The details are as follows.

When the motion video player application 13 calls for the motion video playing API 18 in the OS 15, the call for the API comes down to a driver layer and the device driver 16 detects the call (S14). In this way, the device driver 16 identifies that the content of the screen to be displayed on the display unit 20 is the motion video.

Similarly, when the three-dimensional game application 14 calls for the three-dimensional graphics API 19 in the OS 15, the call for the API comes down to the driver layer and the device driver 16 detects the call (S14). In this way, the device driver 16 identifies that the content of the screen to be displayed on the display unit 20 is a three-dimensional game.

After detection of the call for the API, the device driver 16 determines whether or not the display device in use is a television set (S15). When the display device is a television set, the process goes to the next Step S16. If the display device is not a television set, the process skips to Step S19 to be described later. In this embodiment, the display device in use is the television set 12. Accordingly, the process goes to Step S16.

The device driver 16 generally recognizes devices connected to the computer 11 upon start-up or resume from a suspended or hibernated state. Therefore, the device driver 16 can determine whether or not the television set is connected by checking a state of a television output port connected to the graphics adapter 17.

The device driver 16 determines whether the output mode currently set up is the underscan mode or the overscan mode (S16). In the case of the underscan mode, the process goes to the next Step S17. In the case of the overscan mode, the process skips to Step S19 to be described later.

The output mode for the television set 12 is generally set up in a register (not shown) in the graphics adapter 17. Therefore, the device driver 16 can determine whether the output mode is the underscan mode or the overscan mode by reading a value set in this register.

In the case of the underscan mode, the device driver 16 saves current setting information (the output mode, the gamma value, the brightness of the screen, the contrast of the screen, the tint of the screen, and the like) into the register in the graphics adapter 17 or into a recording medium such as a memory in the computer 11 (S17).

For example, in the case of the underscan mode for displaying a normal computer screen, the gamma value is set to "1" which is suitable for displaying the normal computer screen. Meanwhile, in the case of the overscan mode for displaying the motion video or the game, the gamma value is set to "2.2" which is suitable for displaying the motion video or the game. Therefore, the gamma value "1" is saved if the current output mode is the underscan mode.

Here, it is possible to set the above-mentioned value as a default gamma value, and to set a desired value in response to an operation by the user.

The other setting information such as the brightness, the contrast, or the tint is generally optimized by setting as shown in the following Table 1.

TABLE 1

|  | Underscan Mode | Overscan Mode |
| --- | --- | --- |
| Brightness | Bright | Dark |
| Contrast | Low | High |
| Tint | Pale | Deep |

As it is apparent from Table 1, the brightness factor is set to "bright" in the underscan mode and "dark" in the overscan mode. The contrast factor is set to "low" in the underscan mode and "high" in the overscan mode. The tint factor is set to "pale" in the underscan mode and "deep" in the overscan mode.

Another setting example of the brightness, the contrast, and the tint will be shown in the following Table 2.

TABLE 2

|  | Underscan Mode | Overscan Mode |
| --- | --- | --- |
| Brightness | 100 | 65 |
| Contrast | 240 | 255 |
| Tink (K) | 6500 | 9300 |

In Table 2, the brightness factor is represented by an arbitrary unit which can be defined in a range from 0 to 255. Here, the brightness factor is set to "100" in the underscan mode and "65" in the overscan mode. The contrast factor is also represented by an arbitrary unit which can be defined in a range from 0 to 255. Here, the contrast factor is set to "240" in the underscan mode and "255" in the overscan mode. The tint factor is represented by a color temperature. The tint factor is set to "6500 K" in the underscan mode and "9300 K" in the overscan mode. Therefore, if the current output mode is the underscan mode, the brightness factor "100", the contrast factor "240" and the tint factor "6500 K" are saved. Note that the above-mentioned values are only an example of the default values, and the user can set any other desired values.

Subsequently, the device driver 16 switches the output mode to the overscan mode, and simultaneously changes the gamma value, the brightness of the screen, the contrast of the screen, the tint of the screen, and the like to a predetermined values (S18). To be more precise, the device driver 16 sets the gamma value to "2.2", the brightness factor to "65", the contrast factor to "255", and the tint factor to "9300 K", respectively as the values indicating the overscan mode into the register in the graphics adapter 17.

Then, the device driver 16 assigns the control to the application 13 or 14 and to the OS 15 (S19).

As a result of the above-described operation, when the user starts playing the DVD or the game, the display mode of the television set 12 is automatically switched to the overscan mode.

(2) When Displaying Normal Computer Screen

The motion video player application 13 is terminated when the user finishes playing the DVD, and the three-dimensional game application 14 is terminated when the user finishes playing the game (S21). In this way, the computer 11 returns to a normal OS mode (S22). Similarly, when the display mode of the screen is switched from the full-screen display mode to a desktop display mode when the application 13 or 14 is in operation (S21), the computer 11 also returns to the normal OS mode (S22).

Subsequently, the device driver 16 detects the call for the API 18 or 19, or a request for changing the display mode (S23). The details are as follows.

When terminating the motion video player application 13, the motion video playing API 18 is called in order to release resources used at that time. Meanwhile, when terminating the three-dimensional game application 14, the three-dimensional graphics API 19 is called in order to release the resources used at that time. These calls also come down to the driver layer. Accordingly, the device driver 16 detects any of the calls (S23). In this way, the device driver 16 detects termination of the application 13 or 14, and identifies that the content to be displayed on the display unit 20 is the normal computer screen.

In the meantime, when the display mode of the screen is switched from the full-screen display mode to the desktop display mode, the OS 15 issues the request for changing the display mode to the device driver 16, and the device driver 16 detects the request (S23). In this way, the device driver 16 identifies the change to the desktop display mode and identifies that the content of the screen to be displayed on the display unit 20 is the normal computer screen.

Subsequently, the device driver 16 determines whether or not the display device in use is the television set (S24). When the display device is the television set, the process goes to the next Step S25. If the display device is not the television set, the process skips to Step S26 to be described later. In this embodiment, the display device in use is the television set 12. Accordingly, the process goes to Step S25.

The device driver 16 reads the previous setting information (the output mode, the gamma value, the brightness of the screen, the contrast of the screen, the tint of the screen, and the like) out of the register in the graphics adapter 17 or the recording medium such as the memory in the computer 11, and restores these values to the original setting. When the output mode is switched from the underscan mode to the overscan mode in the above-described Step S18, the output mode is restored from the overscan mode to the underscan mode. To be more precise, the device driver 16 sets the values indicating the underscan mode into the register in the graphics adapter 17. Simultaneously, the gamma value, the brightness of the screen, the contrast of the screen, the tint of the screen, and the like are also restored to the original values. For example, the device driver 16 restores the gamma value to the original value of "1.0", the brightness factor to the original value of "100", the contrast factor to the original value of "240", and the tint factor to the original value of "6500 K", respectively.

Thereafter, the device driver 16 assigns the control to the application 13 or 14 and to the OS 15 (S26).

As a consequence, when the user finishes playing the DVD or the game, or when then user switches the display mode of the screen from the full-screen display mode to the desktop display mode, the display mode of the television set 12 is automatically switched to the underscan mode.

As described above, according to the embodiment, the device driver 16 detects the content of the screen to be displayed, and switches the output mode to the television set 12 between the overscan mode and the underscan mode depending on the detected content. Hence, it is possible to switch the display mode of the television set 12 automatically depending on the state of use of the computer 11.

Moreover, the device driver 16 detects the call for the API and thereby switches the output mode between the overscan mode and the underscan mode. Accordingly, it is only necessary to modify the existing device driver. In this way, it is possible to use the applications 13 and 14, the OS 15, the graphics adapter 17, the television set 12, and the like directly without modification.

The embodiment of the present invention has been described. However, it is to be noted that the above-described embodiment is only an example of embodying the present invention. It is therefore to be understood that the present invention shall not be limited only to the above-described embodiment, and various modifications of the above-described embodiment are possible without departing from the scope of the invention.

The display mode switching device of the present invention is applicable to a computer system applying a television set as a display device.

Embodiments of the present invention include various functions, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software.

As described above, a program-product embodiment according to the present invention is provided for deployment to a computer system on computer readable medium such as CDROM or DVDROM. However, in one embodiment, a program product including the functions described herein is produced as computer executable program code and provided for deployment to a computer system on other than computer medium. The term "produced" as used herein refers to any process by which a selling entity may produce the program code. The program code can be produced, for example, through the process of source and/or object code compilation as is well known in the art, or, through a purchasing process.

Further note that providing the program code for deployment to a computer system for execution thereon can be achieved in many different ways. For example the program code could be provided for placement in storage which is accessible to a remote computer system and from which such computer systems can download the program code. For example the storage may be accessible from an internet site or an FTP (file transfer protocol) site. Alternatively the program code could be provided by transmission to the computer system over a computer network, for example as part of an e-mail or other network message transmission.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
a content identifier which identifies content to be displayed on a television set; and
a switch, coupled to said content identifier, which switches an output mode for the television set to an overscan mode or to an underscan mode depending on a result of identification obtained by said content identifier;
wherein said content identifier identifies that the content to be displayed on the television set is any one of a motion video and a game by detecting a call for a given application program interface from any one of a motion video player application and a game application, and
said switch automatically switches the output mode for the television set to the overscan mode on condition that the content to be displayed on the television set is identified as any one of the motion video and the game.

2. A method comprising:
a content identifying step of identifying a content to be displayed on a television set; and
a switching step of switching an output mode to the television set to an overscan mode or to an underscan mode depending on a result of the content identifying step;
wherein said identifying and switching are performed by a device driver stored in a computer-readable recording medium;
wherein the content identifying step further comprises a step of identifying that the content to be displayed on the television set is any one of a motion video and a game by detecting a call for a given application program interface from any one of a motion video player application and a game application, and
the switching step further comprises a step of automatically switching the output mode for the television set to the overscan mode on condition that the content to be displayed on the television set is identified as any one of the motion video and the game.

3. A product comprising:
a computer-readable recording medium having computer readable program code stored therein, the computer readable program code in said product causing a computer to execute:
a content identifying step of identifying a content to be displayed on the television set; and
a switching step of switching an output mode for the television set to an overscan mode or to an underscan mode depending on a result of identification obtained by the content identifying step;
wherein the content identifying step further comprises a step of identifying that the content to be displayed on the television set is any one of a motion video and a game by detecting a call for a given application program interface from any one of a motion video player application and a game application, and
the switching step further comprises a step of automatically switching the output mode for the television set to the overscan mode on condition that the content to be displayed on the television set is identified as any one of the motion video and the game.

4. An apparatus comprising:
a processor; and
a device driver operatively coupled to the processor and stored in a computer-readable recording medium, the device driver comprising:
a content identification unit configured to identify content to be displayed on a display device; and
a switching unit, coupled to said content identification unit, configured to automatically switch an output mode for the display device to an overscan mode or to an underscan mode depending on identified content to be displayed;
wherein the content identification unit is configured to identify the content to be displayed by detecting a call for an application program interface from any one of a motion video player application and a game application.

* * * * *